O. L. RUDE.
GARDEN WEED PULLER.
APPLICATION FILED MAY 26, 1920.

1,403,110.

Patented Jan. 10, 1922.

Oscar L. Rude INVENTOR.

WITNESSES
Ernest P. Crocker

BY
Norman T. Whitaker
his ATTORNEY.

UNITED STATES PATENT OFFICE.

OSCAR L. RUDE, OF WESTBY, WISCONSIN.

GARDEN WEED PULLER.

1,403,110.   Specification of Letters Patent.   Patented Jan. 10, 1922.

Application filed May 26, 1920. Serial No. 384,328.

*To all whom it may concern:*

Be it known that I, OSCAR L. RUDE, a citizen of the United States, and a resident of Westby, in the county of Vernon and State of Wisconsin, have invented a Garden Weed Puller, of which the following is a specification.

My invention relates to weed pullers and its principal object resides in the provision of a hand implement which will pull the weeds from around the roots of plants without injuring the same.

Further, the invention provides a hand operated weeder that may be operated among thickly growing plants and effectively clear the weeds therefrom without endangering the plants in any respect.

My invention also provides a hand operated weeder which includes a weed catcher or receptacle into which the weeds are drawn upon being pulled from the ground.

Still another object is to provide a hand implement that can be carried about conveniently and operated with facility to clear a garden of weeds or other undesirable growths.

It is also an object of the invention to provide a hand operated implement of this character which is of comparative simple construction and thus may be manufactured at a nominal cost.

With the above and other objects in mind as may hereinafter be outlined the invention consists in the novel combination of elements, constructions and arrangement of parts, operations and specific details to be fully explained and illustrated in the accompanying drawing wherein, Figure 1 is a side elevation of a weed puller constructed in accordance with the invention, parts being broken away;

Figure 1:
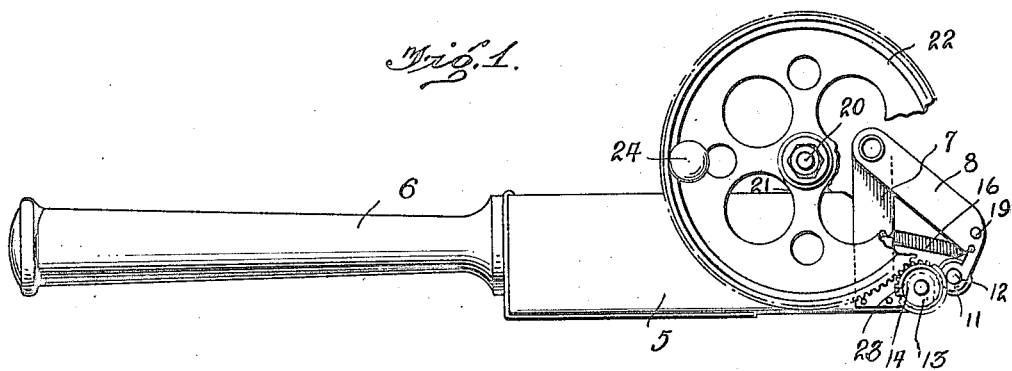
Figure 2:
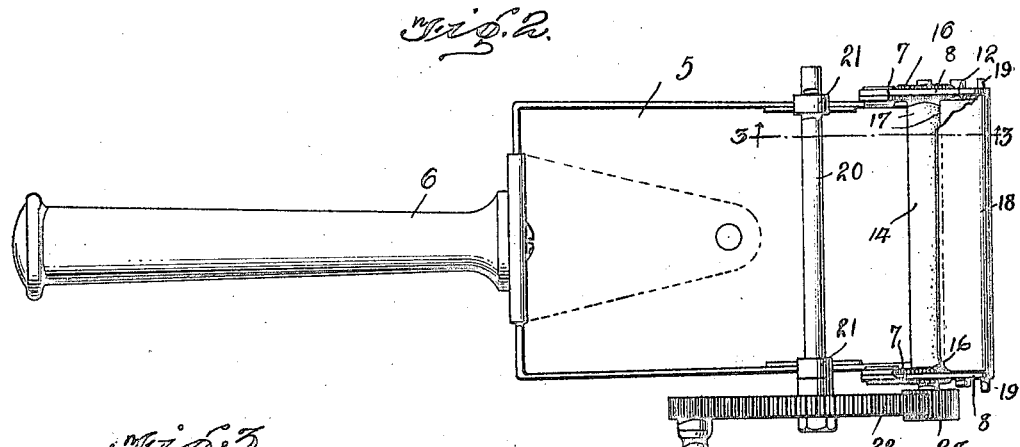
Fig. 2 is a top plan view of the same.
Figure 3:
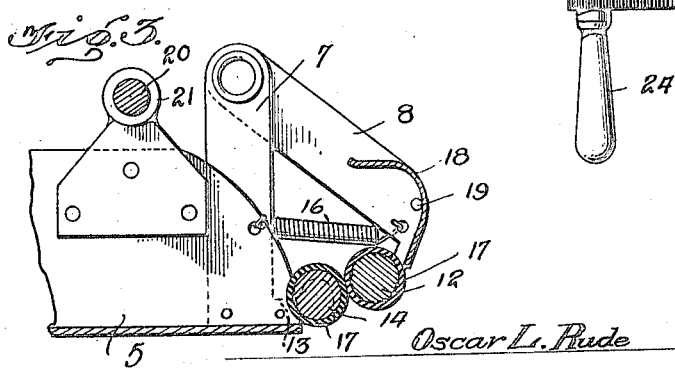
Fig. 3 is a fragmentary longitudinal sectional view taken on line 3—3 of Figure 2.

Referring in detail to the drawing wherein like characters of reference indicate corresponding parts throughout the several views the numeral 5 denotes a receptacle or weed catcher open at its front and top. A handle 6 is secured to the rear wall of the weed catcher or receptacle.

Extending vertically from the side walls of the weed catcher 5 at the forward end thereof and in transverse alignment is a pair of fixed arms 7 to the upper ends of which a pair of forwardly and normally obliquely disposed arms 8 are pivoted, the latter terminating in laterally disposed bearings 11 at their free ends and journaled therein is a roller 12.

Bearings 13 extend forwardly from the lower ends of the fixed arms and are in close proximity to the bottom of the receptacle 5. A roller 14 is journaled in these bearings with which the roller 12 co-operates in drawing the weeds therebetween and against which this roller 12 is resiliently held by coil springs 16 attached to the fixed arms and pivoted arms adjacent the free ends thereof. These co-acting rollers are faced with friction producing material 17, which is preferably rubber, so that the weeds will be effectively grasped between the co-acting rollers and drawn into the weed catcher 5.

A transversely bowed shield or guard 18 is disposed between the pivoted arms 8 and overlies the co-acting rollers to prevent the weeds from flying forwardly upon rotation of the rollers, this shield being formed with an outstanding lug 19 at its opposite ends which are engaged in the arms 8 and thereby supported.

A shaft 20 is journaled in bearings 21 secured to the side walls of the weed catcher 5 at their upper edge and fixed to rotate with this shaft is a relatively large drive gear 22 that meshes with a pinion 23 carried by one end of the roller 14. An operating handle 23 is provided for the drive gear 22.

In operation the device is arranged at an angle with the outer ends of the pivoted arms resting on the ground and the rollers in proximity to the weeds. The drive gear is then rotated to drive the co-acting gripping rollers in reverse directions which grips the weeds therebetween and draws them rearwardly where they are deposited in the weed catcher.

It is to be understood that the form of my invention herein shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. A weeder including a weed catcher open at its forward end, a roller journaled at the forward end and adjacent the bottom of the catcher, a pair of arms pivoted to the catcher above the roller and normally extending downwardly at an angle, a roller carried thereby, and resilient means yieldably retaining the latter against the first mentioned roller, and means for rotating one of the rollers.

2. A weeder including a weed catcher, open at its forward end, a roller journaled at the forward end and adjacent the bottom of the catcher, a pair of arms pivoted to the catcher above the roller and normally extending downwardly at an angle, a roller carried thereby, a transversely bowed shield supported between the arms and overlying the rollers, and resilient means yieldably retaining the latter against the first mentioned roller, and means for rotating one of the rollers.

3. A weeding implement including a receptacle open at one end thereof, a handle carried by the opposite end whereby to hold the receptacle at an angle with respect to the ground, a pair of co-acting gripping rollers journaled at the open end of the receptacle, and manually operable gearing for rotating the rollers in opposite directions to draw the weeds therebetween and into the receptacle.

4. A weed puller including a receptacle open at one end thereof, a roller journaled at the bottom of the receptacle at the open end, and extending entirely across the latter, a pair of rigid arms extending from opposite sides of the receptacle, a pair of arms pivoted to the outer ends thereof, a roller journaled therein, contractile springs connected with the rigid arms and the pivoted arms and yieldably holding one roller against the other, and means for imparting rotary movement to one of the rollers.

OSCAR L. RUDE.